(12) United States Patent
Cendrillon et al.

(10) Patent No.: US 8,965,295 B2
(45) Date of Patent: Feb. 24, 2015

(54) SYSTEMS AND METHODS FOR SUPPRESSING INTERFERENCE IN A SIGNAL RECEIVED BY A DEVICE HAVING TWO OR MORE ANTENNAS

(71) Applicant: Marvell World Trade Ltd., St. Michael (BB)

(72) Inventors: Raphael Cendrillon, Palo Alto, CA (US); Yakun Sun, Sunnyvale, CA (US); Jiwoong Choi, Mountain View, CA (US); Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 225 days.

(21) Appl. No.: 13/654,925

(22) Filed: Oct. 18, 2012

(65) Prior Publication Data
US 2013/0102256 A1    Apr. 25, 2013

Related U.S. Application Data

(60) Provisional application No. 61/548,848, filed on Oct. 19, 2011.

(51) Int. Cl.
H04B 1/00    (2006.01)
H04B 15/00    (2006.01)
(Continued)

(52) U.S. Cl.
CPC ............... *H04B 7/08* (2013.01); *H04B 7/0851* (2013.01); *H04B 7/0854* (2013.01); *H04J 11/0036* (2013.01)
USPC ... 455/63.1; 455/63.4; 455/67.11; 455/67.13; 455/101; 455/226.1; 455/226.2; 455/226.3; 455/296; 375/346; 375/347; 375/348; 375/349; 375/350

(58) Field of Classification Search
USPC ................. 455/63.1, 63.4, 67.11, 67.13, 101, 455/226.1–226.3, 296; 375/260, 267, 316, 375/340, 346, 347, 348, 349, 350, 229, 232, 375/233
See application file for complete search history.

(56) References Cited

U.S. PATENT DOCUMENTS 6,826,240 B1 * 11/2004 Thomas et al. ............... 375/340
7,525,942 B2 * 4/2009 Cordone ....................... 370/335
(Continued)

FOREIGN PATENT DOCUMENTS

EP    1821445    8/2007
WO    0113530    2/2001

OTHER PUBLICATIONS

Office Action dated Aug. 19, 2014 from related/corresponding U.S. Appl. No. 13/655,766, filed Oct. 19, 2012.
(Continued)

*Primary Examiner* — Tuan A Tran (57) ABSTRACT

Systems and methods for suppressing interference from a data signal received at a receiving device, where the receiving device has two or more receive antennas, are provided. Characteristics of a channel are estimated, the channel being a channel through which the data signal was transmitted by a transmitting device to the receiving device. A spatial correlation of interference and noise received at the two or more receive antennas of the receiving device is determined based on the estimated characteristics of the channel. The spatial correlation indicates how the interference and noise received at a particular one of the receive antennas is related to the interference and noise received at another one of the receive antennas. The spatial correlation of the interference and noise is used to suppress interference and noise from the data signal received at the receiving device.

20 Claims, 8 Drawing Sheets

(51) Int. Cl.
*H04B 7/08* (2006.01)
*H04J 11/00* (2006.01)

(56) References Cited

U.S. PATENT DOCUMENTS

| | | | |
|---|---|---|---|
| 7,532,864 B2 * | 5/2009 | Fukuoka et al. | 455/67.13 |
| 7,630,688 B2 * | 12/2009 | Zeira | 455/63.1 |
| 7,639,729 B2 * | 12/2009 | Pan et al. | 375/139 |
| 7,697,602 B2 | 4/2010 | Frey et al. | |
| 7,738,530 B2 * | 6/2010 | Thomas | 375/140 |
| 7,822,101 B2 * | 10/2010 | Reial | 375/144 |
| 7,835,700 B2 * | 11/2010 | Zeira | 455/63.1 |
| 8,270,909 B2 | 9/2012 | Zhang et al. | |
| 8,275,337 B2 * | 9/2012 | Tong et al. | 455/272 |
| 8,503,291 B1 | 8/2013 | Lee et al. | |
| 8,526,892 B2 | 9/2013 | Zhang et al. | |
| 8,625,701 B2 | 1/2014 | Zhang et al. | |
| 8,630,376 B1 | 1/2014 | Zhang | |
| 8,644,412 B2 * | 2/2014 | Jia et al. | 375/267 |
| 8,699,978 B1 | 4/2014 | Nabar et al. | |
| 8,737,501 B2 * | 5/2014 | Shah et al. | 375/267 |
| 2007/0121749 A1 | 5/2007 | Frey et al. | |
| 2009/0310724 A1 | 12/2009 | Shah | |
| 2009/0322613 A1 | 12/2009 | Bala et al. | |
| 2010/0046453 A1 | 2/2010 | Jones et al. | |
| 2010/0087151 A1 | 4/2010 | Auer | |
| 2010/0260138 A1 | 10/2010 | Liu et al. | |
| 2010/0272207 A1 | 10/2010 | Zangi et al. | |
| 2011/0116488 A1 | 5/2011 | Grandhi | |
| 2012/0195391 A1 | 8/2012 | Zhang et al. | |
| 2012/0275332 A1 | 11/2012 | Seok et al. | |
| 2012/0300874 A1 | 11/2012 | Zhang | |
| 2013/0010632 A1 | 1/2013 | Wang et al. | |
| 2013/0102256 A1 | 4/2013 | Cendrillon et al. | |
| 2013/0182662 A1 | 7/2013 | Zhang et al. | |
| 2013/0322277 A1 | 12/2013 | Vanganuru et al. | |
| 2014/0003384 A1 | 1/2014 | Zhang et al. | |
| 2014/0029681 A1 | 1/2014 | Zhang et al. | |
| 2014/0112175 A1 | 4/2014 | Pantelidoiu et al. | |

OTHER PUBLICATIONS

Gallagher, Robert G., Stochastic Processes: Theory for Applications: Chapter 10 Estimation, Cambridge University Press, 2013, ISBN 978-1-107-03975-9, pp. 478-511.
Ganti, Radha Krishna et al., Spatial and Temporal Correlation of the Interference in ALOHA Ad Hoc Networks, Department of Electrical Engineering, University of Notre Dame, Apr. 8, 2009, 7 pages.
Halperin, Daniel et al., 802.11 with Multiple Antennas for Dummies, University of Washington and Intel Labs Seattle, undated, 7 pages.
Salz Jack et al., Effect of Fading Correlation on Adaptive Arrays in Digital Mobile Radio, IEEE Transactions on Vehicular Technology vol. 43, No. 4, Nov. 1994, pp. 1049-1057.
Sadough, Seyed Mohammad-Sajad et al., Recent Developments in Channel Estimation and Detection for MIMO Systems, Chapter 6, undated, pp. 99-122.
Taricco, Giorgia et al., Space-Time Decoding With Imperfect Channel Estimation, IEEE Transactions on Wireless Communications, vol. 4, No. 4, Jul. 2005, pp. 1874-1888.
Werner, Stefan et al., Adaptive Multiple-Antenna Receiver for CDMA Mobile Reception, Helskinki University of Technology, Laboratory of Telecommunications Technology, undated, 5 pages.
International Search Report and Written Opinion of the International Searching Authority dated Mar. 13, 2013 for related/corresponding appl. No. PCT/US12/060804 filed Oct. 18, 2012.
Draft Supplement to Standard [for] Information Technology Telecommunications and information exchange between systems Local and metropolitan area networks Specific requirements Part 11: Wireless LAN Medium Access Control (MAC) and Physical Layer (PHY) specifications: Further Higher Data Rate Extension in the 2.4 GHz band (Amendment to IEEE Std 802.11, 1999 Edition), IEEE P802.11g/D8.2, Apr. 2003.
Gunnam, et al, "Multp-Rate layered Decoder Architecture for Block LDPC Codes of the IEEE 802.11n Wireless Standard", ISCAS 2007: 1645-1648.
Draft Supplement to Standard [for] Information Technology Telecommunications and information exchange between systems Local and metropolitan area networks Specific requirements Part 11: Wireless LAN Medium Access Control (MAC) and Physical Layer (PHY) specifications: Further Higher Data Rate Extension in the 2.4 GHz band (Amendment to IEEE Std 802.11, 1999 Edition) IEEE Std 802.11a-1999.
IEEE P802.11ac™ /D2.1, "Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338), Mar. 2012.
802.11b-1999/Cor 1-2001—IEEE Standard for Information Technology—Telecommunications and Information Exchange Between Systems—Local and Metropolitan Area Networks—Specific Requirement. Part 11: Wireless LAN Medium Access Control (MAC) and Physical Layer (PHY) Specifications. Amendment 2: Higher-Speed Physical Layer (PHY) Extension in the 2.4 GHz Band—Corrigendum 1 (Corrigendum to IEEE Std 802.11b-1999), Nov. 7, 2001.
International Search Report and Written Opinion of the International Searching Authority dated Apr. 3, 2013 for related/corresponding appl. No. PCT/US12/060981 filed Oct. 19, 2012.
Office Action issued Nov. 10, 2014 in related/corresponding U.S. Appl. No. 14/327,878, filed Jul. 10, 2014.

* cited by examiner

SYSTEMS AND METHODS FOR SUPPRESSING INTERFERENCE IN A SIGNAL RECEIVED BY A DEVICE HAVING TWO OR MORE ANTENNAS

CROSS-REFERENCE TO RELATED APPLICATIONS

This disclosure claims priority to U.S. Provisional Patent Application 61/548,848, filed on Oct. 19, 2011, which is incorporated herein by reference.

This application is related to U.S. patent application Ser. No. 13/655,766, filed Oct. 19, 2012, entitled "Systems and Methods for Interference Suppression,", which is herein incorporated by reference in its entirety.

TECHNICAL FIELD

The technology described in this document relates generally to wireless communications and more particularly to systems and methods for decreasing interference in a signal received at a device including two or more receive antennas.

BACKGROUND

In the field of wireless communications, SIMO (Single Input Multiple Output) and MIMO (Multiple Input Multiple Output) technologies have been used to achieve increased data throughput and link range without requiring additional bandwidth or increased transmission power. Both technologies utilize multiple receive antennas on a receiver to enable a multipath rich environment with multiple orthogonal channels existing between a transmitter and the receiver. Data signals can be transmitted in parallel over these channels, thus enabling the increased data throughput and link range. Because of its advantageous properties, SIMO and MIMO technologies have been used in wireless communication standards such as IEEE 802.11n (WiFi), 4G, 3GPP Long Term Evolution (LTE), WiMAX, and HSPA+.

Despite the performance improvements enabled by SIMO and MIMO systems, interference in a data signal received by a receiving device may have a significant impact on throughput and reliability of data transmissions in these systems. In LTE systems employing SIMO and MIMO, for example, interference may be a major limitation in performance, especially as cell size decreases.

SUMMARY

The present disclosure is directed to systems and methods for suppressing interference from a data signal received at a receiving device, where the receiving device has two or more receive antennas. In a method for suppressing interference from a data signal received at a receiving device, the receiving device having two or more receive antennas, characteristics of a channel are estimated, the channel being a channel through which the data signal was transmitted by a transmitting device to the receiving device. A spatial correlation of interference and noise received at the two or more receive antennas of the receiving device is determined based on the estimated characteristics of the channel. The spatial correlation indicates how the interference and noise received at a particular one of the receive antennas is related to the interference and noise received at another one of the receive antennas. The spatial correlation of the interference and noise is used to suppress interference and noise from the data signal received at the receiving device.

In another example, a system for suppressing interference from a data signal received at a receiving device, the receiving device having two or more receive antennas, includes a channel estimation block configured to estimate characteristics of a channel through which the data signal was transmitted by a transmitting device to the receiving device. The system also includes a spatial correlation block configured to determine, based on the estimated characteristics of the channel, a spatial correlation of interference and noise received at the two or more receive antennas of the receiving device. The spatial correlation indicates how the interference and noise received at a particular one of the receive antennas is related to the interference and noise received at another one of the receive antennas. The system further includes a filtering block configured to use the spatial correlation of the interference and noise to suppress interference and noise from the data signal received at the receiving device.

DETAILED DESCRIPTION

Figure 1:
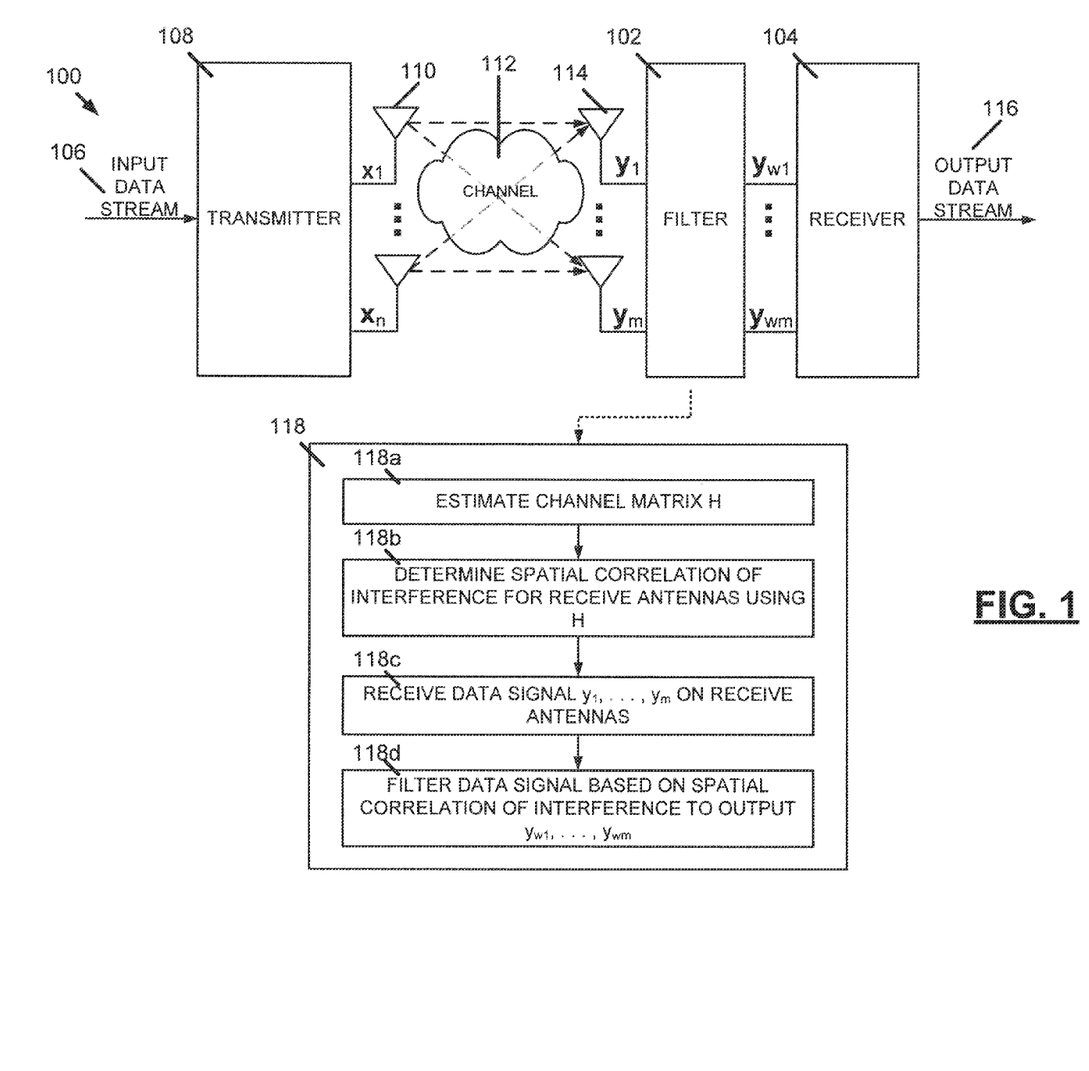
FIG. 1 is a block diagram of an example communications system utilizing an interference rejection filter to decrease interference in a data signal received at a receiver.

FIG. 1 is a block diagram of an example communications system 100 utilizing an interference rejection filter 102 to decrease interference in a data signal received at a receiver 104. In the example communications system 100 of FIG. 1, an input data stream 106 is received by a transmitter 108 and subsequently transmitted over a plurality of transmission antennas 110. The transmission antennas 110 transmit the input data stream 106 using a plurality of signals $x_1, \ldots, x_n$, where n is equal to a number of transmission antennas of the transmitter 108. The plurality of (data) signals $x_1, \ldots, x_n$ are transmitted via a channel 112 to a plurality of receive antennas 114 of the receiver 104. The channel 112 affects the plurality of signals $x_1, \ldots, x_n$ transmitted, such that modified versions of these signals, $y_1, \ldots, y_m$, are received on the receive antennas 114, where m is equal to the number of receive antennas of the receiver 104. The received signals $y_1, \ldots, y_m$ on the receive antennas 114 may be modified from the transmitted signals $x_1, \ldots, x_n$ due to properties of the channel 112, interference at the receive antennas 114, and/or by noise of the channel 112. The system 100 can be described generally via the following equation:

$$y = Hx + z, \qquad \text{(Equation 1)}$$

where H is a channel matrix that defines characteristics of the channel 112, x is a data matrix that defines the plurality of signals $x_1, \ldots, x_n$ transmitted by the transmitter 108, y is a data matrix that defines the plurality of signals $y_1, \ldots, y_m$ received on the receive antennas 114, and z is a noise matrix that affects the transmission of the signals $x_1, \ldots, x_n$. Typically, precoding or beamforming is used at the transmitter 108 when the multiple transmitter antennas 110 are employed. In this single user case, the transmitter antenna weight is included into the channel matrix H. A multi-user case is discussed hereafter.

In Equation 1, the channel matrix H defines characteristics of the transmission channel, generally, as well as characteristics of an interference channel that causes interference to be received at the receive antennas 114. As noted above, the received signals $y_1, \ldots, y_m$ are modified from the originally transmitted signals $x_1, \ldots, x_n$ due to interference at the receive antennas 114. To suppress the interference received at the receiver 104, the interference rejection filter 102 is used to filter the received signals $y_1, \ldots, y_m$ and output filtered signals $y_{w1}, \ldots, y_{wm}$ to the receiver 104. The filtered versions of the received signals, $y_{w1}, \ldots, y_{wm}$, have decreased interference versus their received counterparts $y_1, \ldots, y_m$. Using the filtered signals $y_{w1}, \ldots, y_{wm}$, the receiver 104 generates an output data stream 116. The output data stream 116 may include a summation of the filtered signals $y_{w1}, \ldots, y_{wm}$ or may be based on a different combination of the filtered signals.

The filtering performed by the interference rejection filter 102 suppresses interference in the received signals $y_1, \ldots, y_m$ by decorrelating spatial interference between the receive antennas 114 of the receiver 104. Interference may be spatially correlated between the receive antennas 114, such that the interference rejection filter 102 suppresses the interference by decorrelating interference between the antennas 114. The spatial correlation of the interference between the receive antennas 114 indicates how interference received at a particular one of the receive antennas 114 is related to interference received at another one of the receive antennas 114. The filtering performed by the filter 102 may thus be a spatial whitening process configured to decorrelate the interference between the receive antennas 114.

The interference rejection filter 102 suppresses interference in a signal received at the receiver 104 by performing steps 118 configured to determine the spatial correlation of the interference at the receive antennas 114 and to use the spatial correlation of the interference in a filtering operation. At 118a, the filter 102 estimates the channel matrix H. As described above, the channel matrix H defines characteristics of the channel 112 that affect the transmission of the data signals $x_1, \ldots, x_n$ from the transmitter 108. The receiver 104 and filter 102 have no a priori knowledge of the channel matrix H and thus estimate the channel matrix H based on received data samples (e.g., based on a transmission of a plurality of pilot sequences including known reference data). At 118b, a spatial correlation of interference for the receive antennas 114 is determined using the estimated channel matrix H. The spatial correlation of interference indicates how interference received at a particular one of the receive antennas 114 is related to interference received at another one of the receive antennas 114. The correlation of interference may be determined by analyzing characteristics of the channel matrix H that are attributable to the interference channel or may be determined by analyzing an interference and noise matrix associated with the receive antennas 114. In one example, determining the correlation of interference includes determining a spatial covariance for the interference at the receive antennas 114.

At 118c, the filter 102 receives data signals $y_1, \ldots, y_m$ on the receive antennas 114, where the data signals $y_1, \ldots, y_m$ include interference data. At 118d, using the spatial correlation of interference determined in step 118b, the filter 102 filters the data signals $y_1, \ldots, y_m$ to output filtered versions of the signals $y_{w1}, \ldots, y_{wm}$. The filtered versions of the signals $y_{w1}, \ldots, y_{wm}$ have decreased interference, as the filtering procedure is configured to suppress the interference by decorrelating the interference at the receive antennas 114. The filtered signals $y_{w1}, \ldots, y_{wm}$ are output by the interference rejection filter 102 and transmitted to the receiver 104. Thus, the steps 118 are used to determine the correlation of interference at the receive antennas 114 and to filter the received data signals $y_1, \ldots, y_m$ based on this correlation, such that interference may be suppressed at the receiver 104.

Figure 2:
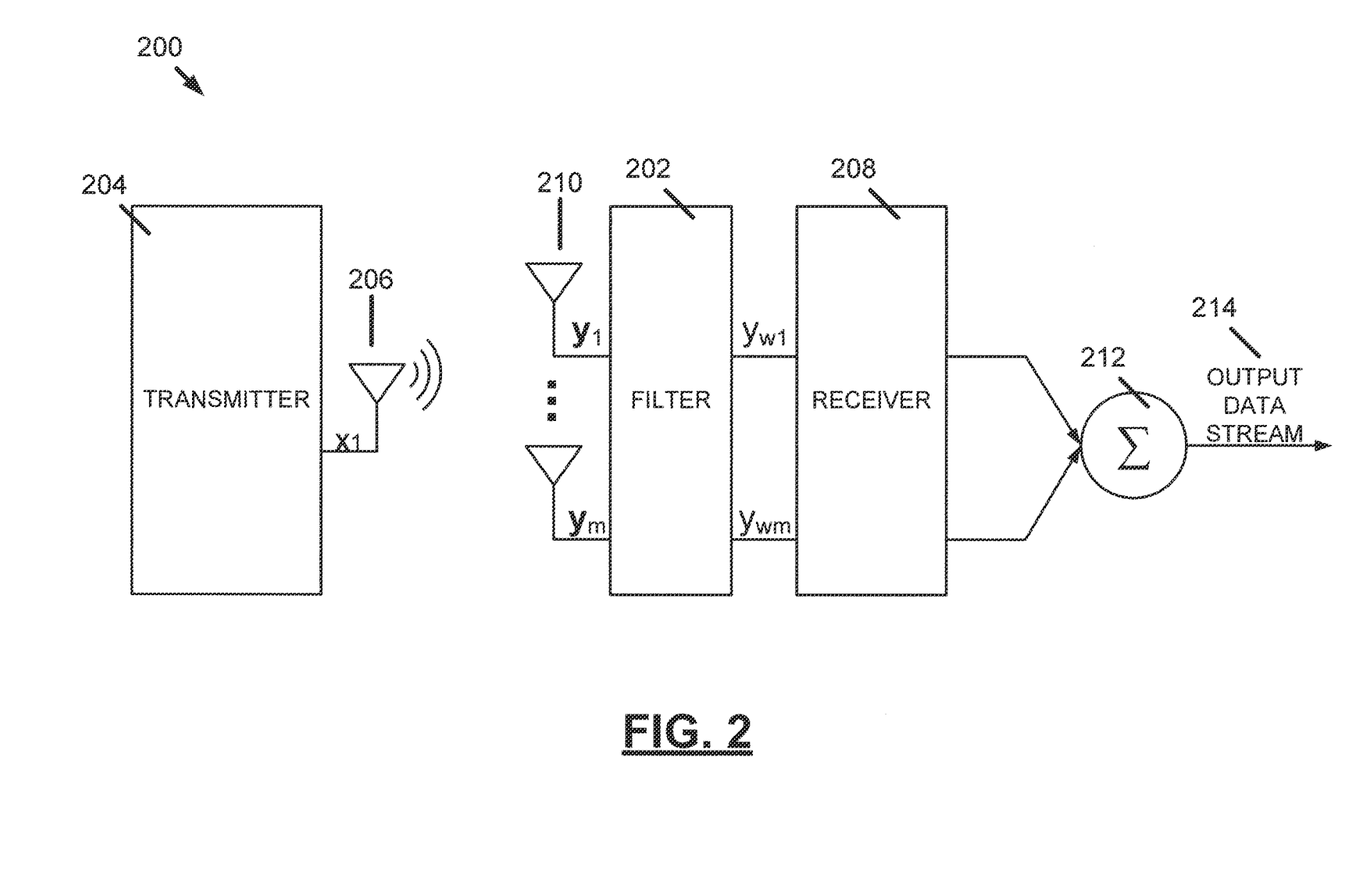
FIG. 2 is a block diagram depicting a SIMO system employing an interference rejection filter to suppress interference in a signal received at a receiver.

Although FIG. 1 depicts the use of the filter 102 to suppress interference in the context of a MIMO (Multiple Input Multiple Output) system having multiple transmission antennas 110 at the transmitter 108, a similar interference rejection filter may be applied in the context of a SIMO (Single Input Multiple Output) system. FIG. 2 is a block diagram depicting a SIMO system 200 employing an interference rejection filter 202 to suppress interference in a signal received at a receiver 208. In the SIMO system 200 of FIG. 2, a transmitter 206 uses a single transmitting antenna 206 to transmit an input signal $x_1$ to the receiver 208 having a plurality of receive antennas 210, where a number of receive antennas 210 is equal to m. Interference at the receive antennas 210 and characteristics of a transmission channel separating the transmitter 204 and the receiver 208 cause signals received at the receive antennas $y_1, \ldots, y_m$ to be modified versus the transmitted signal $x_1$. The filter 202 suppresses the interference at the receive antennas 210 to output filtered versions of the received signals $y_{w1}, \ldots, y_{wm}$ to die receiver 208. Filter 202 functions by determining a spatial correlation of interference between the receive antennas 210 and using the spatial correlation to suppress the interference by decorrelating the interference at the receive antennas 210. The filtered versions of the received signals, $y_{w1}, \ldots, y_{wm}$, are received at a summation node 212 and combined in a single output data stream 214.

Figure 3:
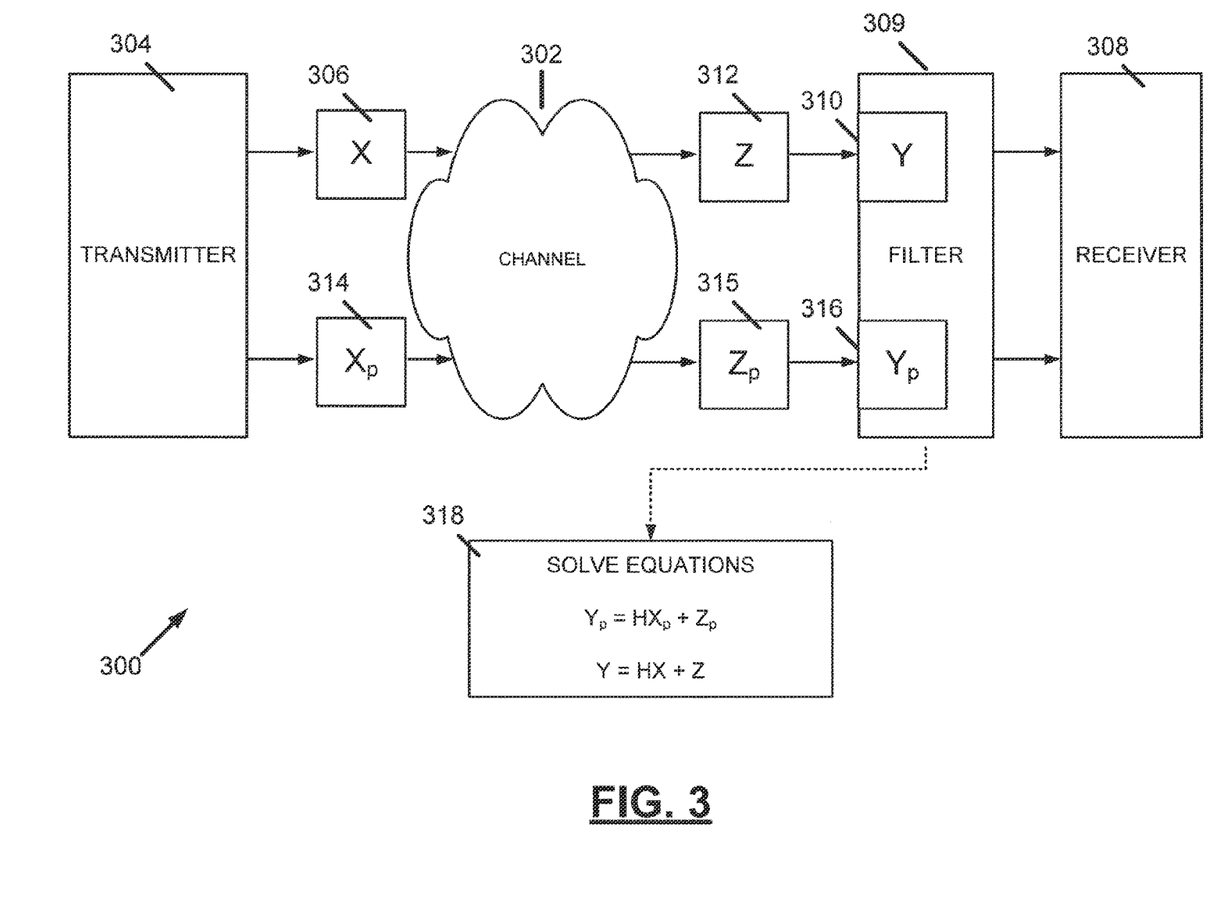
FIG. 3 is a block diagram illustrating a system that uses pilot sequence data to estimate characteristics of a transmission channel.

FIG. 3 is a block diagram illustrating a system 300 that uses pilot sequence data to estimate characteristics of a transmission channel 302. In the system 300 of FIG. 3, a transmitter 304 transmits a data matrix X 306 to a receiver 308. The transmitted data matrix X is received by a filter 309 preceding die receiver 308 as received data matrix Y 310. The received data matrix Y is modified from the transmitted data matrix X due to characteristics of the channel 302 (as defined by channel matrix H) and by a noise matrix Z 312. As explained above with respect to FIGS. 1 and 2, the characteristics of the channel 302 cause interference to be included in the received data matrix Y 310, such that the filter 309 is used to suppress interference by decorrelating the interference at receive antennas of the receiver 308.

To decorrelate the interference at the receive antennas of the receiver 308, the filter 309 estimates the channel matrix H to determine characteristics of the channel 302 affecting the transmission of data matrix X 306. Because neither the filter 309 nor the receiver 308 have a priori knowledge of the channel matrix H, the filter 309 estimates the channel matrix H using received data samples. The filter 309 makes this estimation on based on a transmission of pilot sequence matrix $X_p$ 314 from the transmitter 304. The pilot sequence matrix $X_p$ 314 includes a set of known reference values (i.e., a set of symbols whose locations and values are known to the filter 309 and receiver 308). The pilot sequence matrix $X_p$ 314 and data matrix X 306 are both affected by the same channel matrix H, such that the receive antennas of the receiver 308 separately observe the following matrices:

$$Y=HX+Z, \quad \text{(Equation 2)}$$

and $$Y_p=HX_p+Z_p, \quad \text{(Equation 3)}$$

where $Z_p$ 315 is a noise matrix affecting the transmission of pilot sequence matrix $X_p$ 314, and $Y_p$ 316 is a data matrix received at the filter 309 that is a modified version of the transmitted data matrix $X_p$, the modification being caused by characteristics of the channel matrix H and by the noise matrix $Z_p$ 315. Z and $Z_p$ may have the same distribution and may be set equal to each other in some examples. By solving Equations 2 and 3 at 318, the filter 309 determines an estimated channel matrix H. The filter 309 uses the estimated channel matrix H to determine a relationship between the receive antennas of the receiver 308, where the relationship indicates how interference received at a particular one of the receive antennas is related to interference received at another one of the receive antennas. The filter 309 uses the relationship between the two or more receive antennas to filter the data signal, where the filtering decreases interference data of the received data matrix Y 310 at the receiver 308.

Figure 4A:
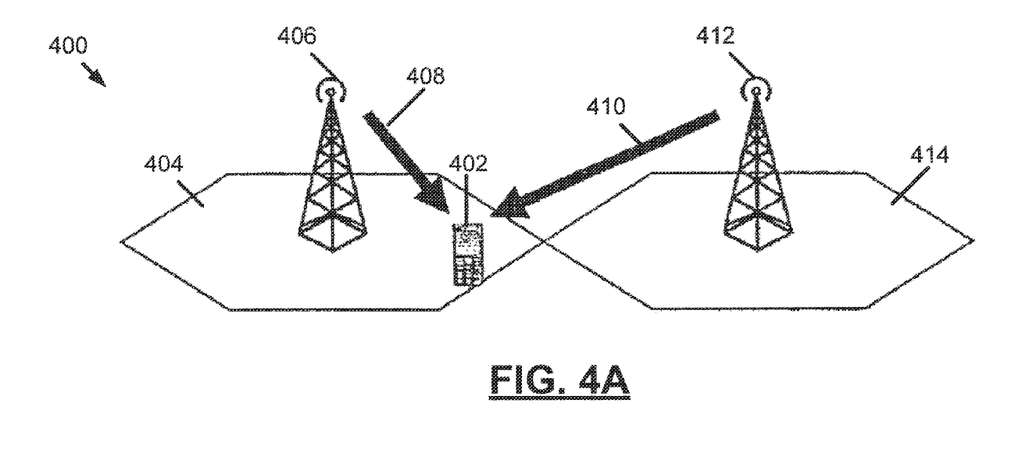
FIGS. 4A and 4B illustrate example systems where inter-cell interference is received at a receiving device having two or more receive antennas.
Figure 4B:
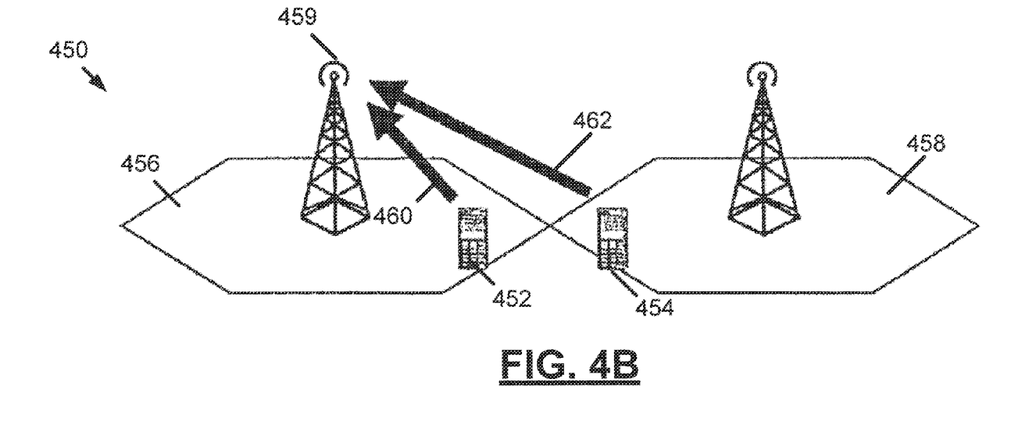

FIGS. 4A and 4B illustrate example systems 400, 450 where intercell interference is received at a receiving device having two or more receive antennas. The system 400 of FIG. 4A illustrates a mobile device 402 functioning as a receiving device in a first cell 404. Within the first cell 404 is a first base station 406 configured to transmit desired signal 408 to the mobile device 402. The mobile device 402 also receives an interference signal 410 from a second base station 412 positioned in a second cell 414. The interference signal 410 is an undesirable, out-of-cell signal that may limit an ability of the mobile device 402 to correctly receive the desired signal 408.

FIG. 4B illustrates first and second mobile devices 452, 454 transmitting data from first and second cells 456, 458, respectively. A first base station 459 receives a desired signal 460 from the first mobile device 452 within its cell 456 and also an undesired, interference signal 462 from the second mobile device 454 positioned outside of the cell 456. In both of the systems 400, 450, mobile devices and base stations preferably receive from and transmit data signals to other devices within their own cells. However, in both systems 400, 450, out of cell (i.e., intercell) interference from neighboring cells may be received (i.e., the undesired interference signals 410 and 462), which may limit the performance of the devices by impacting throughput and reliability of received signals.

In the systems 400, 450 illustrating intercell interference, a received signal matrix y includes terms defined as a result of the desired signal transmissions 408, 460 and terms defined as a result of the undesired, interference transmissions 410, 462:

$$y=Hx+H_ix_i+z, \quad \text{(Equation 4)}$$

where x is a data matrix representing the desired, intracell signals 408, 460, H is a channel matrix affecting transmission of the desired, intracell signals 408, 460, $x_i$ is a data matrix representing the undesired, out-of-cell interference signals 410, 462, $H_i$ is an interference channel matrix affecting transmission of the undesired, out-of-cell interference signals 410, 462, and z is a noise matrix term representing noise included in the received signal matrix y. The rest of the uncorrelated noise is included in z. Thus, in the above equation, the term Hx represents a portion of the received signal matrix y that is a desired signal received from a device positioned within the same cell, and $H_ix_i$ represents another portion of the received signal matrix y that is an undesired, interference signal received from a device positioned in a different cell. For the receive device equipped with, for example, two receive antennas in the systems 400 and 450 of FIGS. 4A and 4B, and with both systems including only, for example, a single out-of-cell device contributing to the intercell interference, Equation 4 may be rewritten as follows:

$$\begin{bmatrix} y_1 \\ y_2 \end{bmatrix} = \begin{bmatrix} h_{11} & h_{12} \\ h_{21} & h_{22} \end{bmatrix}\begin{bmatrix} x_1 \\ x_2 \end{bmatrix} + \begin{bmatrix} h_{i,11} & h_{i,12} \\ h_{i,21} & h_{i,22} \end{bmatrix}\begin{bmatrix} x_{i,1} \\ x_{i,2} \end{bmatrix} + \begin{bmatrix} z_1 \\ z_2 \end{bmatrix}. \quad \text{(Equation 5)}$$

An interference rejection filter uses Interference Rejection Combining (IRC) to suppress interference at a receiving device having two or more receive antennas by decreasing the interference terms (i.e., $H_ix_i$ or $$\begin{bmatrix} h_{i,11} & h_{i,12} \\ h_{i,21} & h_{i,22} \end{bmatrix}\begin{bmatrix} x_{i,1} \\ x_{i,2} \end{bmatrix})$$

of Equations 4 and 5. The interference rejection filter functions based on a determination of a spatial correlation of interference between the receive antennas of the receiving device. By determining the spatial correlation of the interference between the receive antennas of the receiving device, the interference rejection filter can perform a spatial whitening operation on the received signal that is configured to decorrelate the interference between the receive antennas. As described in further detail below, determining the spatial correlation of the interference between the receive antennas may be performed using an estimate of a spatial covariance matrix for interference at the two or more receive antennas.

The interference rejection filter functions to suppress intercell interference in systems similar to those depicted in FIGS. 4A and 4B as follows. To suppress intercell interference at the receive antennas of the receiving device, characteristics of a transmission channel H must be estimated. As described above with respect to FIG. 3, the channel H is configured for transmission of data between a transmitting device and the receiving devices and can be estimated based on a transmission of a plurality of pilot sequences (i.e., a cell-specific reference sequence) including known reference data from the transmitting device to the receiving devices. For example, in the system 400 of FIG. 4A, the base station 406 transmits the plurality of pilot sequences to the in-cell mobile device 402. The mobile device 402 has knowledge of the plurality of pilot sequences transmitted by the base station 406. Using the plurality of pilot sequences including known reference data, the interference rejection filter employed by the mobile device 402 can estimate the channel matrix H (e.g., using the method as described above with respect to FIG. 3).

The estimated channel matrix H, including estimated characteristics of the transmission channel between the transmitting device and the receiving device, is used by the interference rejection filter to determine an interference and noise matrix $\hat{q}$ associated with the two or more receive antennas of the receiving device. In the equation below, it is assumed that the receiving device has two receive antennas:

$$\begin{bmatrix} q_{rx1} \\ q_{rx2} \end{bmatrix} = \hat{q} = \hat{y} - \hat{H}\hat{x}, \qquad \text{(Equation 6)}$$

where $q_{rx1}$ is an interference and noise term associated with a first receive antenna of the receiving device, $q_{rx2}$ is an interference and noise term associated with a second receive antenna of the receiving device, $\hat{q}$ is the interference and noise matrix associated with the receive antennas of the receiving device, $\hat{y}$ is a received signal vector representing a signal received at the receiving device that includes desired signal components as well as intercell interference signal components, $\hat{H}$ is the estimated channel matrix affecting transmission of signals between the transmitting device and the receiving device, and $\hat{x}$ is a matrix representing the plurality of pilot sequences of known reference data transmitted from the transmitting device. By subtracting the $\hat{H}\hat{x}$ term from the received signal vector $\hat{y}$ in Equation 6, the interference and noise portions of the received signal vector $\hat{y}$ may be determined. Equation 6 is rewritten below to illustrate these components of the interference and noise matrix $\hat{q}$:

$$\begin{bmatrix} q_{rx1} \\ q_{rx2} \end{bmatrix} = \hat{q} = \hat{H}_i \hat{x}_i + \hat{z}, \qquad \text{(Equation 7)}$$

where $\hat{z}$ is a noise matrix representing a noise component of the received signal vector $\hat{y}$, and $\hat{H}_i \hat{x}_i$ is a term representing intercell interference included in the received signal vector $\hat{y}$, with $\hat{H}_i$ being an interference channel matrix affecting transmission of undesired, out-of-cell interference and $\hat{x}_i$ being a data matrix representing undesired, out-of-cell interference signals received at the receiving device. Thus, in Equations 6 and 7 above, the estimated channel matrix $\hat{H}$, determined based on the transmission of the plurality of pilot sequences of known reference data, is used to determine the interference and noise matrix $\hat{q}$ associated with the receive antennas.

Using the interference and noise matrix $\hat{q}$ associated with the receive antennas, a spatial covariance matrix can be determined by correlating $\hat{q}$ between the receive antennas of the receiving device according to the following equation:

$$\hat{R}_{\hat{i}} = \sum_{pilots} \hat{q}\hat{q}^H, \qquad \text{(Equation 8)}$$

where $\hat{R}_{\hat{i}}$ is the spatial covariance matrix for interference at the receive antennas of the receiving device determined according to a summation performed across the plurality of pilot sequences.

Using the spatial covariance matrix for interference at the receive antennas, $\hat{R}_{\hat{i}}$, the interference rejection filter can be calculated according to:

$$W = (\hat{R}_{\hat{i}})^{-1/2}. \qquad \text{(Equation 9)}$$

Figure 5:
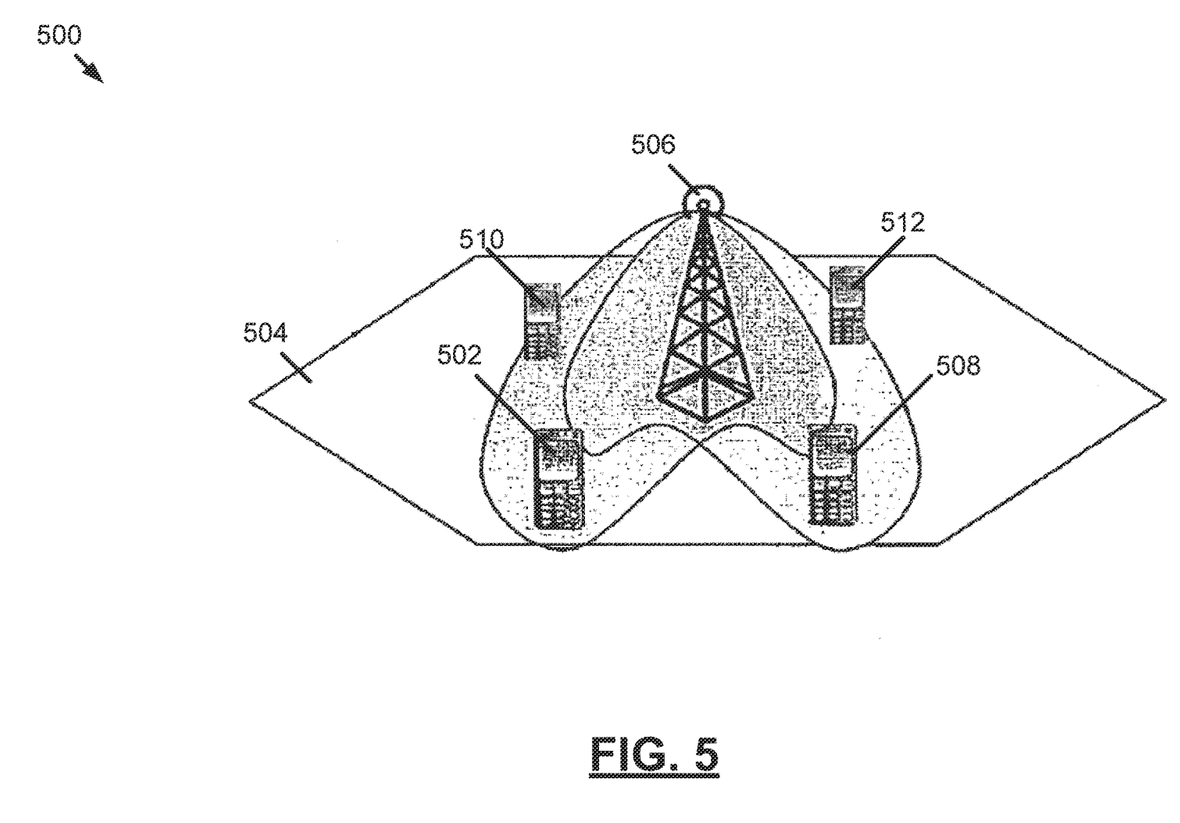
FIG. 5 illustrates an example system where multi-user interference is received at a receiving device having two or more receive antennas.

FIG. 5 illustrates an example system 500 where multi-user interference is received at a receiving device having two or more receive antennas. The system 500 of FIG. 5 illustrates a first mobile device 502 functioning as a receiving device in a cell 504. Within the cell 504 is a base station 506 configured to transmit a signal to the first mobile device 502. Also within the cell 504 are second, third, and fourth mobile devices 508, 510, 512. In the system 500 of FIG. 5, the base station 506 transmits signals to the mobile devices 502, 508, 510, 512 simultaneously and within a same frequency range (e.g., using spatial division multiple access to schedule the mobile devices 502, 508, 510, 512). The base station 506 accomplishes the simultaneous transmissions using beamforming to shape the signals being transmitted to each of the mobile devices 502, 508, 510, 512. The shaping of the signals caused by the beamforming is intended to reduce incidence of a signal being received by devices for which the signal was not intended. For example, to shape the signals being transmitted to the mobile devices 502, 508, 510, 512, the base station 506 utilizes interference precoding using a precoding matrix P defined according to:

$$P = H^{-1}, \qquad \text{(Equation 10)}$$

where H is the channel matrix defining characteristics of the transmission channel between the base station 506 and the mobile devices 502, 508, 510, 512.

Although the beamforming precoding matrix P is used to eliminate interference at the first mobile device 502 by shaping the signal transmitted to the first mobile device 502, an imperfect estimation of channel matrix H causes the first mobile device 502 to receive residual multi-user interference as a result of the beamforming. The imperfect estimation of channel matrix H may be due to quantization of channel state information (CSI) feedback at the base station 506. The multi-user interference caused by the imperfect interference precoding is distinguishable from intercell interference: multi-user interference is interference originating from inside of a cell of a receiving device (i.e., due to the presence of the multiple devices 502, 508, 510, 512 in the cell 504), while intercell interference is interference originating from outside of the cell of the receiving device. In considering the effect of multi-user interference on a signal received at the mobile device 502, a received signal matrix y is defined as follows:

$$y = HP \begin{bmatrix} x_{user} \\ x_{mi} \end{bmatrix} + z, \qquad \text{(Equation 11)}$$

where H is the channel matrix affecting transmission of signals from the base station 506 to the mobile devices 502, 508, 510, 512, P is the beamforming precoding matrix as defined in Equation 10, $x_{user}$ is a data matrix representing a desired signal to be transmitted between the base station 506 and the first mobile device 502, $x_{mi}$ is a data matrix representing the undesired, multi-user interference signals received as a result of imperfect interference precoding performed by the base station 506 (i.e., signals intended for second, third, and fourth mobile devices 508, 510, 512), and z is a noise matrix term received by the first mobile device 502. Equation 11 may be rewritten as follows to highlight the presence of an interference term affecting the received signal matrix y:

$$y = H_{eff} x_{user} + H_{mi} x_{mi} + z, \qquad \text{(Equation 12)}$$

where $H_{eff}$ is a channel matrix affecting transmission of the desired signal $x_{user}$ to be transmitted between the base station 506 and the first mobile device 502, and $H_{mi}$ is a channel matrix affecting transmission of the undesired, multi-user interference signals $x_{mi}$ to the first mobile device 502. In Equation 12, the term $H_{eff} x_{user}$ represents a portion of the received signal matrix y that is the desired signal received from the base station 506, and the term $H_{mi} x_{mi}$ represents another portion of the received signal matrix y that is the undesired, multi-user interference signal received by the first mobile device 502.

In considering the example system 500 of FIG. 5 including the first, second, third, and fourth mobile devices 502, 508, 510, 512, Equation 11 may also be rewritten as follows:

$$y = HP \begin{bmatrix} x_{user} \\ x_{i1} \\ x_{i2} \\ x_{i3} \end{bmatrix} + z, \quad \text{(Equation 13)}$$

where $x_{i1}$, $x_{i2}$, and $x_{i3}$ represent the undesired, multi-user interference signals received by the first mobile device 502 as a result of the presence of the second, third, and fourth mobile devices 508, 510, 512 within the cell 504. Using this notation, Equation 12 can be rewritten as follows:

$$y = H_{eff} x_{user} + H_{mi} \begin{bmatrix} x_{i1} \\ x_{i2} \\ x_{i3} \end{bmatrix} + z. \quad \text{(Equation 14)}$$

The interference term $$H_{mi} \begin{bmatrix} x_{i1} \\ x_{i2} \\ x_{i3} \end{bmatrix}$$

of Equation 14 can be minimized by an interference rejection filter by determining a spatial covariance matrix $\hat{R}_i$ for interference at the two or more receive antennas of the first mobile device 502 and performing a filtering operation on the received signal matrix y based on the spatial covariance matrix.

To determine the spatial covariance matrix $\hat{R}_i$ for interference, the base station 506 transmits a plurality of a pilot sequences (e.g., demodulation reference sequences). As a result of the imperfect interference preceding applied by the base station 506, multi-user interference will occur on the pilot sequences. Equation 14 can be rewritten as follows, where T pilot sequence sets are transmitted and a received signal at the first mobile device 502 is observed for each (i.e., T different observations are made at the first mobile device 502 using the plurality of pilot sequences):

$$\begin{bmatrix} y(1) \\ \vdots \\ y(T) \end{bmatrix} = \begin{bmatrix} x_{user}(1) & x_{i1}(1) & x_{i2}(1) & x_{i3}(1) \\ \vdots & \vdots & \vdots & \vdots \\ x_{user}(T) & x_{i1}(T) & x_{i2}(T) & x_{i3}(T) \end{bmatrix} \begin{bmatrix} H_{eff} \\ H_{mi} \end{bmatrix} + z, \quad \text{(Equation 15)}$$

where y(1) is a signal received at the first mobile device 502 as a result of a first pilot sequence set transmitted by the base station 506, y(T) is a signal received at the first mobile device 502 as a result of the Tth pilot sequence set transmitted by the base station 506, $x_{user}(1)$ represents the first pilot sequence transmitted for the first mobile device 502, $x_{user}(T)$ represents the Tth pilot sequence transmitted for the first mobile device 502, and the $x_{i1}$, $x_{i2}$, and $x_{i3}$ terms represent first and Tth pilot sequences transmitted for the second, third, and fourth mobile devices 508, 510, 512, respectively.

Because the first mobile device 502 has knowledge of the pilot sequences, the first mobile device 502 can estimate the effective channel using a least squares approach:

$$\begin{bmatrix} H_{eff} \\ H_{mi} \end{bmatrix} = (X^H X)^{-1} X^H y, \quad \text{(Equation 16)}$$

where y is equal to $$\begin{bmatrix} y(1) \\ \vdots \\ y(T) \end{bmatrix}$$

and X is equal to $$\begin{bmatrix} x_{user}(1) & x_{i1}(1) & x_{i2}(1) & x_{i3}(1) \\ \vdots & \vdots & \vdots & \vdots \\ x_{user}(T) & x_{i1}(T) & x_{i2}(T) & x_{i3}(T) \end{bmatrix}$$

from Equation 15. The matrix $$\begin{bmatrix} H_{eff} \\ H_{mi} \end{bmatrix}$$

is a channel estimate matrix containing an estimate of the channel between the base station 506 and the first mobile device 502 ($H_{eff}$) and an estimate of the interference channel affecting transmission of the undesired multi-user interference signals originating as a result of the second, third, and fourth mobile devices 508, 510, 512 ($H_{mi}$). Because the first mobile device knows the signal received, y, as well, as the pilot, sequences sent, from the base station 506, an estimate of the interference channel matrix $H_{mi}$ can be made.

Using the interference channel matrix $H_{mi}$, the spatial covariance matrix $\hat{R}_{\hat{i}}$ for interference at the plurality of receive antennas of the mobile device 502 can be determined according to a summation performed across the plurality of pilot sequences:

$$\hat{R}_i = \sum_{pilots} H_{mi} H_{mi}^H + \hat{R}_z, \quad \text{(Equation 17)}$$

Thus, in Equation 17, the interference channel matrix $H_{mi}$, which includes characteristics of the channel configured for transmission of interference to the first mobile device 502, is used to determine the spatial covariance matrix $\hat{R}_i$. The spatial covariance matrix $\hat{R}_i$ also includes the covariance matrix $\hat{R}_z$ measured in typical noise power estimation blocks.

Receiving devices commonly receive both intercell interference and multi-user interference, and thus, a spatial covariance matrix for interference at the plurality of receive antennas of a receiving device may be determined according to:

$$\hat{R}_i = \hat{R}_{intercell} + \hat{R}_{intracell}, \quad \text{(Equation 18)}$$

where $\hat{R}_i$ is the spatial covariance matrix, $\hat{R}_{intercell}$ is an intercell spatial covariance matrix for the interference-plus-noise from other transmitters, and $\hat{R}_{-intracell}$ is a multi-user spatial interference covariance matrix. As in the example described above, $\hat{R}_{intercell}$ may be configured to suppress interference originating from outside of a cell of the receiving device plus the noise, and $\hat{R}_{intracell}$ may be configured to suppress interference originating from inside of the cell of the receiving device. In other words, $\hat{R}_{intercell}$ is determined for the interference and noise that are not from the desired transmitter; where $\hat{R}_{intracell}$ is determined for the interference that is from the desired transmitter.

Equation 18 illustrates how to find the overall spatial covariance matrix at the plurality of receive antennas, where the interference includes intercell and multi-user interference. More generally, the spatial correlation of interference is determined using a difference approach (i.e., based on an interference and noise matrix or based on interference channels), and the overall spatial covariance matrix is the sum of the spatial covariance matrices from the different approaches. Thus, the overall spatial covariance matrix may be calculated as follows:

$$\hat{R}_1 = \hat{R}_{interference-noise-matrix} + \hat{R}_{interference-channels} \quad \text{(Equation 19)}$$

Using the spatial covariance matrix, which accounts for both intercell and multi-user interference, an interference rejection filter can be calculated as follows:

$$W = (\hat{R}_1)^{-1/2}. \quad \text{(Equation 20)}$$

In addition to suppressing intercell and multi-user interference, the interference rejection filter defined according to Equation 20 may be configured to suppress other noise sources that are correlated between receive antennas of a receiving device.

Figure 6:
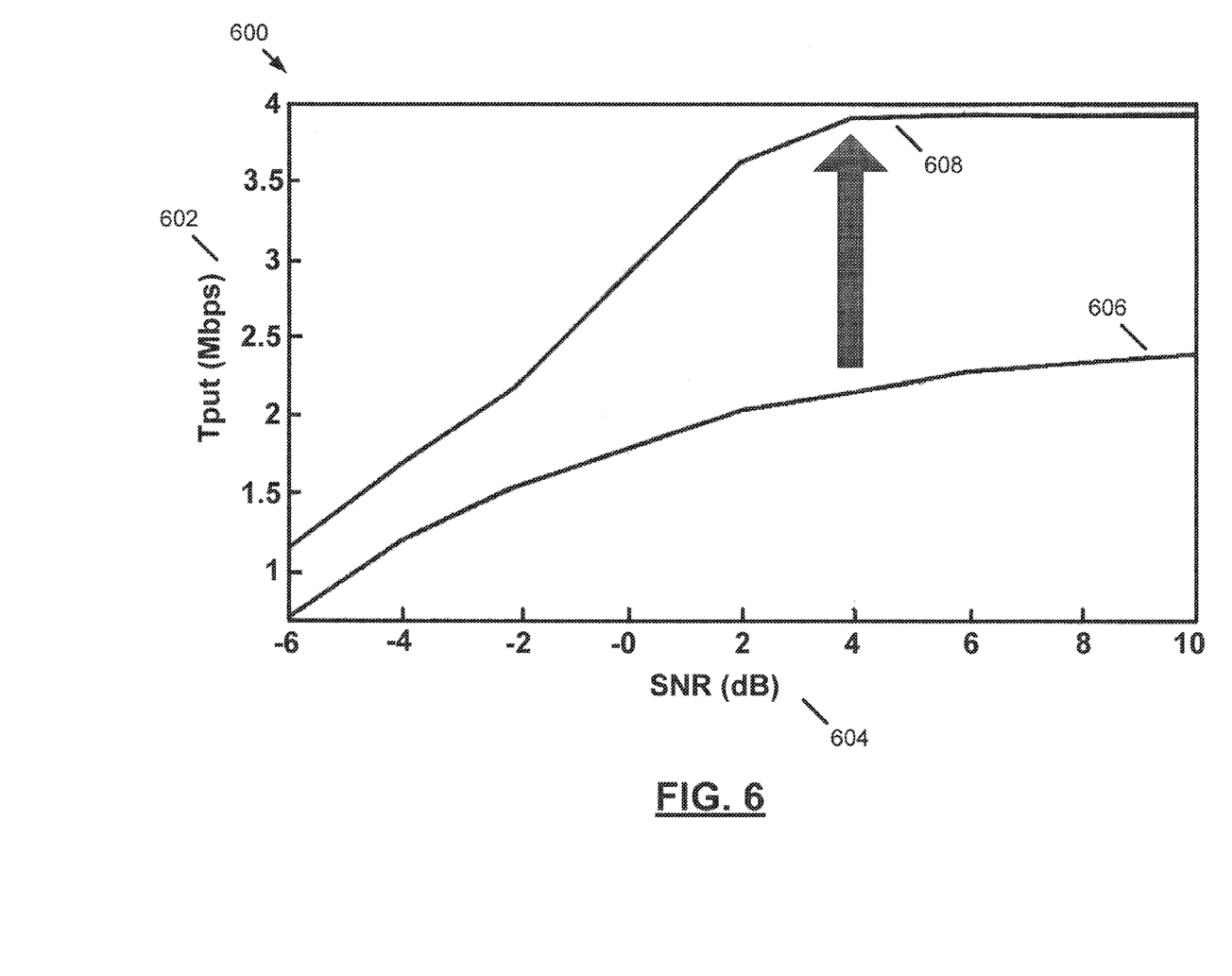
FIG. 6 is a graph illustrating an example improvement in throughput enabled using an interference rejection filter.

FIG. 6 is a graph 600 illustrating an example improvement in throughput enabled using an interference rejection filter. In the graph 600, an x-axis 604 represents a signal-to-noise ratio for a communications system, and the y-axis 602 represents a throughput of the system. The communications system described by the graph 600 is a system involving a transmitter and a receiver having two or more receive antennas, where the receiver receives a data signal including interference. The system may be similar to those illustrated in FIGS. 4A, 4B, and 5, where intercell and/or multi-user interference may be received at the receiver. Curve 606 of FIG. 6 illustrates performance of a receiver that does not include an interference rejection filter. The curve 606 illustrates that at higher signal-to-noise ratios for this receiver, the throughput of the receiver may reach an upper ceiling that is limited by interference. By contrast, a curve 608 of FIG. 6 illustrates performance of a receiver that includes an interference rejection filter (i.e., a filter defined according to Equation 19). The interference rejection filter increases performance of the receiver and allows the receiver to have a higher throughput value at all signal-to-noise ratio values. The improvement in performance is due to a reduction of interference in received data signals by the receiver.

Figure 7:
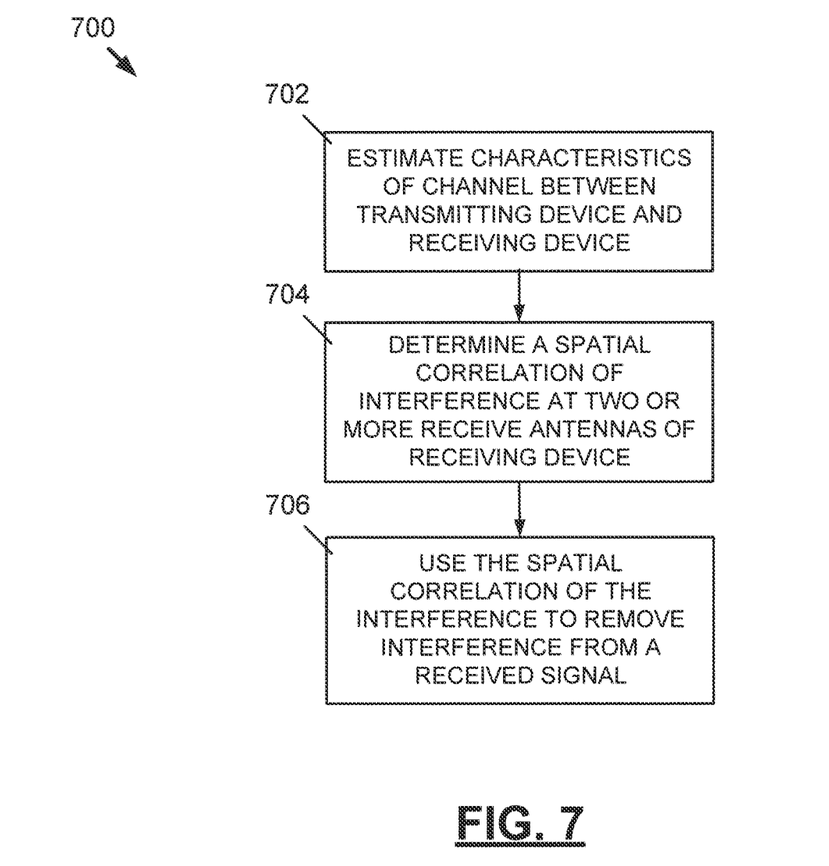
FIG. 7 is a flowchart illustrating a method for suppressing interference from a data signal received at a receiving device, the receiving device having two or more receive antennas.

FIG. 7 is a flowchart illustrating a method for suppressing interference from a data signal received at a receiving device, the receiving device having two or more receive antennas. At 702, characteristics of a channel through which the data signal was transmitted by a transmitting device to the receiving device are estimated. At 704, a spatial correlation of interference and noise received at the two or more receive antennas of the receiving device is determined. The spatial correlation of interference is determined based on the estimated characteristics of the channel and indicates how the interference and noise received at a particular one of the receive antennas is related to the interference and noise received at another one of the receive antennas. At 706, the spatial correlation of the interference and noise is used to suppress interference and noise from the data signal received at the receiving device.

Figure 8:
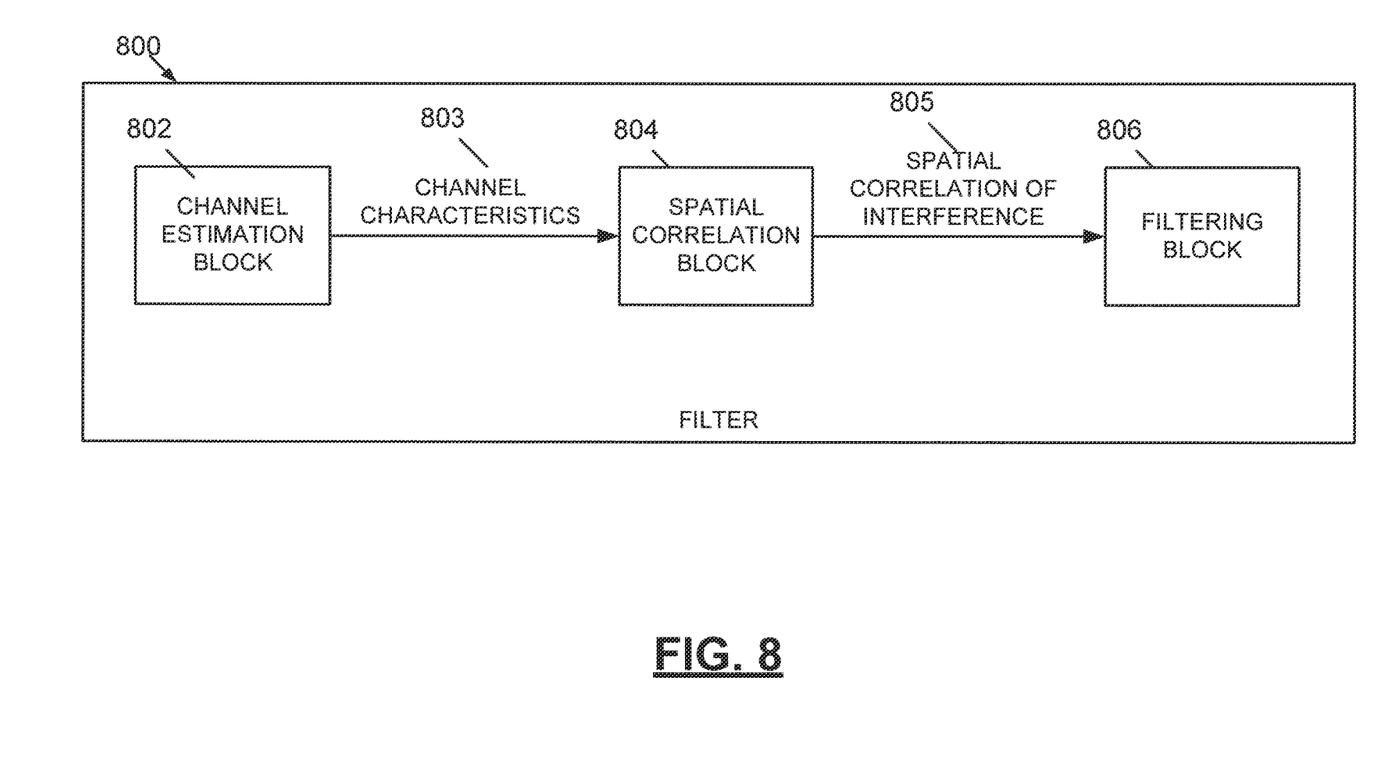
FIG. 8 depicts a filter for suppressing interference from a received data signal.

FIG. 8 depicts a filter 800 for suppressing interference from a received data signal. The filter 800 includes a channel estimation block 802, a spatial correlation block 804, and a filtering block 806. The channel estimation block 802 is configured to estimate characteristics of a channel 803, where the channel is a channel through which the data signal was transmitted by a transmitting device to a receiving device. The spatial correlation block 804 is configured to determine a spatial correlation of interference and noise 805 received at two or more receive antennas of the receiving device based on the estimated characteristics of the channel 803. The spatial correlation 805 indicates how the interference and noise received at a particular one of the receive antennas is related to the interference and noise received at another one of the receive antennas. The filtering data block 806 is configured to use the spatial correlation of the interference and noise 805 to suppress interference and noise from the data signal received at the receiving device.

While the disclosure has been described in detail and with reference to specific embodiments thereof, it will be apparent to one skilled in the art that various changes and modifications can be made therein without departing from the scope of the embodiments. Thus, it is intended that the present disclosure cover the modifications and variations of this disclosure provided they come within the scope of the appended claims and their equivalents.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive of" may be used to indicate situations where only the disjunctive meaning may apply.

It is claimed:

1. A method for suppressing interference from a data signal received at a receiving device, the receiving device having two or more receive antennas, the method comprising:
   estimating characteristics of a channel through which the data signal was transmitted by a transmitting device to the receiving device;
   determining, based on the estimated characteristics of the channel, a spatial correlation of interference and noise received at the two or more receive antennas of the receiving device, the spatial correlation indicating how the interference and noise received at a particular one of the receive antennas is related to the interference and noise received at another one of the receive antennas; and
   using the spatial correlation of the interference and noise to suppress interference and noise from the data signal received at the receiving device.

2. The method of claim 1, wherein determining the spatial correlation of the interference and noise comprises determining a spatial covariance matrix for the interference and noise at the two or more receive antennas.

3. The method of claim 2, wherein the characteristics of the channel are estimated based on a transmission of a plurality of pilot sequences including known reference data from the transmitting device to the receiving device, and wherein the estimated characteristics of the channel are used to determine an interference and noise matrix associated with the two or more receive antennas.

4. The method of claim 3, wherein the spatial covariance matrix is determined according to a summation performed across the plurality of pilot sequences:

$$\hat{R}_i = \sum_{pilots} \hat{q}\hat{q}^H,$$

where $\hat{R}_i$ is the spatial covariance matrix, $\hat{q}$ is the interference and noise matrix associated with the two or more receive antennas, and superposition $(\ )^H$ is an operation of Hermitian transpose of a complex matrix.

5. The method of claim 2, wherein the characteristics of the channel are estimated based on a transmission of a plurality of pilot sequences including known reference data from the transmitting device to the receiving device, and wherein the estimated characteristics of the channel include an interference channel matrix, the interference channel matrix including characteristics of a channel configured for transmission of interference to the receiving device.

6. The method of claim 5, wherein the spatial covariance matrix is determined according to a summation performed across the plurality of pilot sequences:

$$\hat{R}_i = \sum_{pilots} H_{mi}H_{mi}^H + \hat{R}_z,$$

where $\hat{R}_i$ is the spatial covariance matrix, $H_{mi}$ is the interference channel matrix, $\hat{R}_z$ is the noise covariance matrix, and superposition $(\ )^H$ is an operation of Hermitian transpose of a complex matrix.

7. The method of claim 5, wherein the interference channel matrix is determined using a least squares approach.

8. The method of claim 2, wherein the spatial covariance matrix is determined according to:

$$\hat{R}_i = \hat{R}_{interference\text{-}noise\text{-}matrix} + \hat{R}_{interference\text{-}channel},$$

wherein $\hat{R}_i$ is the spatial covariance matrix, $\hat{R}_{interference\text{-}noise\text{-}matrix}$ is a spatial interference and noise covariance matrix determined from interference and noise, and $\hat{R}_{interference\text{-}channel}$ is a spatial interference covariance matrix determined from interference channels.

9. The method of claim 2, wherein the spatial covariance matrix is determined according to $$\hat{R}_i = \hat{R}_{intercell} + \hat{R}_{intracell},$$

wherein $\hat{R}_i$ is the spatial covariance matrix, $\hat{R}_{intercell}$ is a spatial interference and noise covariance matrix determined for the interference and noise not from the transmitting device, and $\hat{R}_{intracell}$ is a spatial interference covariance matrix determined for the interference from the transmitting device.

10. The method of claim 2, wherein using the spatial correlation of the interference to suppress interference from the signal comprises filtering the signal using an interference rejection filter W determined according to:

$$W = (\hat{R}_i)^{-1/2},$$

where $\hat{R}_i$ is the spatial covariance matrix.

11. A system for suppressing interference from a data signal received at a receiving device, the receiving device having two or more receive antennas, the system comprising:
 a channel estimation block configured to estimate characteristics of a channel through which the data signal was transmitted by a transmitting device to the receiving device;
 a spatial correlation block configured to determine, based on the estimated characteristics of the channel, a spatial correlation of interference and noise received at the two or more receive antennas of the receiving device, the spatial correlation indicating how the interference and noise received at a particular one of the receive antennas is related to the interference and noise received at another one of the receive antennas; and
 a filtering block configured to use the spatial correlation of the interference and noise to suppress interference and noise from the data signal received at the receiving device.

12. The system of claim 11, wherein the spatial correlation block is configured to determine a spatial covariance matrix for interference and noise at the two or more receive antennas.

13. The system of claim 12, wherein the channel estimation block estimates the characteristics of the channel based on a transmission of a plurality of pilot sequences including known reference data from the transmitting device to the receiving device, and wherein the channel estimation block uses the estimated characteristics of the channel to determine an interference and noise matrix associated with the two or more receive antennas.

14. The system of claim 13, wherein the spatial correlation block determines the spatial covariance matrix according to a summation performed across the plurality of pilot sequences:

$$\hat{R}_i = \sum_{pilots} \hat{q}\hat{q}^H,$$

where $\hat{R}_i$ is the spatial covariance matrix, $\hat{q}$ is the interference and noise matrix associated with the two or more receive antennas, and superposition $(\ )^H$ is an operation of Hermitian transpose of a complex matrix.

15. The system of claim 12, wherein the channel estimation block estimates the characteristics of the channel based on a transmission of a plurality of pilot sequences including known reference data from the transmitting device to the receiving device, and wherein the estimated characteristics of the channel include an interference channel matrix, the interference channel matrix including characteristics of a channel configured for transmission of interference to the receiving device.

16. The system of claim 15, wherein the spatial correlation block determines the spatial covariance matrix according to a summation performed across the plurality of pilot sequences:

$$\hat{R}_i = \sum_{pilots} H_{mi}H_{mi}^H + \hat{R}_z,$$

where $\hat{R}_i$ is the spatial covariance matrix, $H_{mi}$ is the interference channel matrix, $\hat{R}_z$ is the noise covariance matrix, and superposition $(\ )^H$ is an operation of Hermitian transpose of a complex matrix.

17. The system of claim 15, wherein the interference channel matrix is determined using a least squares approach.

18. The system of claim 12, wherein the spatial correlation block determines the spatial covariance matrix according to:

$$\hat{R}_i = \hat{R}_{interference\text{-}noise\text{-}matrix} + \hat{R}_{interference\text{-}channel},$$

wherein $\hat{R}_i$ is the spatial covariance matrix, $\hat{R}_{interference\text{-}noise\text{-}matrix}$ is a spatial interference and noise covariance matrix determined from interference and noise, and $\hat{R}_{interference\text{-}channel}$ is a spatial covariance matrix determined from the interference channels.

19. The system of claim 12, wherein the spatial correlation block determines the spatial covariance matrix according to $$\hat{R}_i = \hat{R}_{intercell} + \hat{R}_{intracell},$$

wherein $\hat{R}_i$ is the spatial covariance matrix, $\hat{R}_{intercell}$ is a spatial interference and noise covariance matrix determined for the interference and noise not from the transmitting device, and $\hat{R}_{intracell}$ is a spatial interference covariance matrix determined for the interference from the transmitting device.

20. The system of claim 12, wherein the filtering block filters the signal using an interference rejection filter W determined according to:

$$W = (\hat{R}_i)^{-1/2},$$

where $\hat{R}_i$ is the spatial covariance matrix.

* * * * *